United States Patent
Schroedel

(10) Patent No.: US 10,103,599 B2
(45) Date of Patent: Oct. 16, 2018

(54) ELECTROMOTIVE DRIVE SYSTEM ELECTRONIC HOUSING WITH PLUG CONNECTIONS FOR DC VOLTAGE SUPPLIES, FIELD BUSSES AND DIGITAL INPUTS AND OUTPUTS

(71) Applicant: Baumueller Nuernberg GmbH, Nuremberg (DE)

(72) Inventor: Georg Schroedel, Nuremberg (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 0 days.

(21) Appl. No.: 15/154,559

(22) Filed: May 13, 2016

(65) Prior Publication Data

US 2016/0261165 A1 Sep. 8, 2016

Related U.S. Application Data

(63) Continuation of application No. PCT/EP2014/002133, filed on Aug. 1, 2014.

(30) Foreign Application Priority Data

Nov. 13, 2013 (DE) .................... 20 2013 010 294 U

(51) Int. Cl.
*H02K 5/00* (2006.01)
*H02K 5/22* (2006.01)
*H02K 11/33* (2016.01)

(52) U.S. Cl.
CPC ............ *H02K 5/225* (2013.01); *H02K 11/33* (2016.01); *H02K 2213/06* (2013.01); *H02K 2213/12* (2013.01)

(58) Field of Classification Search
CPC .......... H02K 5/225; H02K 5/22; H02K 11/33; H02K 223/06; H02K 223/12
USPC ................ 310/71; 439/26, 540.1, 701, 928.1
See application file for complete search history.

(56) References Cited

U.S. PATENT DOCUMENTS 5,125,854 A * 6/1992 Bassler ................ H01R 13/514
439/536
5,364,291 A * 11/1994 Hashiguchi ........ H01R 13/6582
439/607.56
5,380,216 A * 1/1995 Broeksteeg ........ H01R 13/6335
439/352

(Continued)

FOREIGN PATENT DOCUMENTS

CN 11487520 A 4/1997
CN 101854039 A 10/2010

(Continued)

OTHER PUBLICATIONS

Animatics SmartMotor Series 4 User's Guide, Revision 5. Dating 2008.*

(Continued)

*Primary Examiner* — Bernard Rojas
*Assistant Examiner* — Maged Almawri
(74) *Attorney, Agent, or Firm* — Muncy, Geissler, Olds & Lowe, P.C.

(57) ABSTRACT

An electromotive drive system having an electronics housing on the motor side and having, detachably plugged thereinto, a connection housing for connecting and contacting connection wires in particular direct current supply wires, of at least two connection cables.

9 Claims, 3 Drawing Sheets

(56) References Cited

U.S. PATENT DOCUMENTS

| | | | |
|---|---|---|---|
| 5,629,574 A | 5/1997 | Cognetti et al. | |
| 6,004,162 A | 12/1999 | Harting et al. | |
| 6,969,284 B2 * | 11/2005 | Singer | H01R 13/518 |
| | | | 439/582 |
| 7,322,842 B2 | 1/2008 | Dueck et al. | |
| 2003/0200761 A1 | 10/2003 | Funahashi et al. | |
| 2005/0020142 A1 * | 1/2005 | Singer | H01R 13/518 |
| | | | 439/701 |
| 2007/0188984 A1 * | 8/2007 | Opsitos, Jr. | H01R 13/6616 |
| | | | 361/600 |
| 2008/0212273 A1 * | 9/2008 | Bechtolsheim | G06F 1/183 |
| | | | 361/679.33 |
| 2010/0151723 A1 | 6/2010 | Su et al. | |
| 2010/0243321 A1 | 9/2010 | Adachi et al. | |
| 2011/0287642 A1 | 11/2011 | Wang et al. | |
| 2012/0000703 A1 * | 1/2012 | Kim | H01R 13/6592 |
| | | | 174/70 R |
| 2012/0056572 A1 | 3/2012 | Bigler et al. | |
| 2012/0161590 A1 | 6/2012 | Yamasaki et al. | |
| 2012/0286604 A1 | 11/2012 | Abe et al. | |
| 2012/0286630 A1 | 11/2012 | Tomizawa et al. | |
| 2013/0122737 A1 * | 5/2013 | Fransen | H01R 4/2445 |
| | | | 439/389 |

FOREIGN PATENT DOCUMENTS

| | | | | |
|---|---|---|---|---|
| DE | 295 21 213 U1 | | 1/1997 | |
| DE | 29521213 | * | 4/1997 | |
| DE | 29521213 | * | 9/1997 | |
| DE | 297 23 145 U1 | | 4/1998 | |
| DE | 197 07 120 C1 | | 6/1998 | |
| DE | 20 2005 020 857 U1 | | 11/2006 | |
| DE | 20 2008 003 138 U1 | | 8/2009 | |
| DE | 10 2008 058 926 A1 | | 5/2010 | |
| DE | 20 2012 103 360 U1 | | 1/2013 | |
| EP | 0 570 181 A2 | | 11/1993 | |
| EP | 0 577 201 A1 | | 1/1994 | |
| EP | 1 353 412 A2 | | 10/2003 | |
| EP | 1 460 748 A1 | | 9/2004 | |
| EP | 1 780 844 A1 | | 5/2007 | |
| EP | 2 482 427 A2 | | 8/2012 | |
| WO | WO2011/129773 A1 | | 10/2011 | |
| WO | WO 2012/003347 A1 | | 1/2012 | |
| WO | WO 2013098228 A3 | * | 7/2014 | H02K 3/522 |

OTHER PUBLICATIONS

English Translation of DE29521213 from Espacenet.*
DE29521213 English Translation.*
Animatics Smart Motor Series 4 Guide Rev.5 date 2008.*
Raymond, Martha K., "Servomotor bundles components in a small package", Machine Design, Penton Media, vol. 70, No. 9, p. 62, ISSN: 0024-9114 (May 21, 1998).
"Anschlusstechnik und Dezentralisierung", Messen und Pruefen, IVA International, vol. 36, No. 6, pp. 16, 18-21, ISSN: 0937-3446 (Jun. 1, 2000).

* cited by examiner

ELECTROMOTIVE DRIVE SYSTEM ELECTRONIC HOUSING WITH PLUG CONNECTIONS FOR DC VOLTAGE SUPPLIES, FIELD BUSSES AND DIGITAL INPUTS AND OUTPUTS

This nonprovisional application is a continuation of International Application No. PCT/EP2014/002133, which was filed on Aug. 1, 2014, and which claims priority to German Patent Application No. 20 2013 010 294.2, which was filed in Germany on Nov. 13, 2013, and which are both herein incorporated by reference.

BACKGROUND OF THE INVENTION

Field of the Invention

The invention relates to an electromotive drive system having an electronics housing arranged on a motor side, in particular for accommodating converter components.

Description of the Background Art

For example, in the area of energy-, and/or data- or signal-networked drive systems, in particular in the area of industrial engineering, it is frequently desirable to provide an electromotive drive system which has a preferably compact design. In addition, a decentralized drive is to be provided, on the one hand, and a supply-, signal- and/or communication-based interaction with other (decentralized) drives is to be facilitated, on the other hand. The communication should be able to preferably take place via bus systems, for example via EtherCAT. Moreover, a drive electronic system and software components as well as preferably a drive mechanism should be largely combined within the drive system.

SUMMARY OF THE INVENTION

It is therefore an object of the invention to provide in an embodiment, an electromotive drive system, which has an electronics housing disposed on the motor side and a connection housing detachably plug-contacted thereto, is provided for this purpose. The connection housing is used to connect connecting wires of at least two connecting cables, which guide the connecting wires. The connection housing is also preferably provided and configured to through-connect at least one power supply of the drive system from one of the connecting cables to the other connecting cable and thus from or to another drive system. For this purpose, the connection housing is preferably provided internally with connectors for through-contacting at least certain connecting wires of the connecting cables.

The plug connection between the connection housing and the electronics housing takes place with the aid of plug and mating plug connections which are provided on facing plug contact sides of the connection housing, on the one hand, and of the electronics housing, on the other hand. The connection housing furthermore has a front or connection side opposite the plug contact side for the purpose of feeding the connecting cables and, in particular the connecting wires guided thereby, into the housing interior of the connection housing and in order to perform the contacting of the wire ends of the individual connecting wires within the housing.

After contacting the individual connecting wires within the connection housing, the latter effectively forms a shared plug connector for the two connecting cables in the manner of a tee connector, so that the two connecting cables are plug-contacted with the electronics housing together and simultaneously by means of the connection housing. It is particularly advantageous that, due to the through-contacting and thus the through-connection, in particular of the power supply or the corresponding connecting wires, another drive assigned to the corresponding connecting cable, or another electromotive drive system, continues to be supplied with energy even if the plug connection between the connection housing and the electronics housing is detached.

Due to the corresponding contacting within the connection housing, the connection or the link between the connecting wires guided by the two connecting cables (signal and/or data wires) may likewise be maintained even if the plug connection between the connection housing and the electronics housing of the corresponding electromotive drive system is detached.

The connecting wires guided by the connecting cables are, in particular, supply wires for a link DC voltage in the range of, for example, 60 V(DC) to 800 V(DC) for supplying energy to the electric motor, in particular, from a DC link, as well as for a supply DC voltage of, for example, 24 V(DC) for supplying energy to electronic components for the purpose of controlling or regulating the electric motor.

For the terminal contacting of the connecting wires guided by the connecting cables within the connection housing, the connection housing has at least one cable opening on the front side for the purpose of feeding the connecting wires guided by these connecting cables into the housing interior of the connection housing. A printed circuit board supporting the plug connections or their contact points is preferably provided internally therein. The connecting cables do not require any male and/or female plug connectors shared by the connecting wires at the ends of the cables, since these connectors are formed by the shared connection housing for both connecting cables, including the through-contacting.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
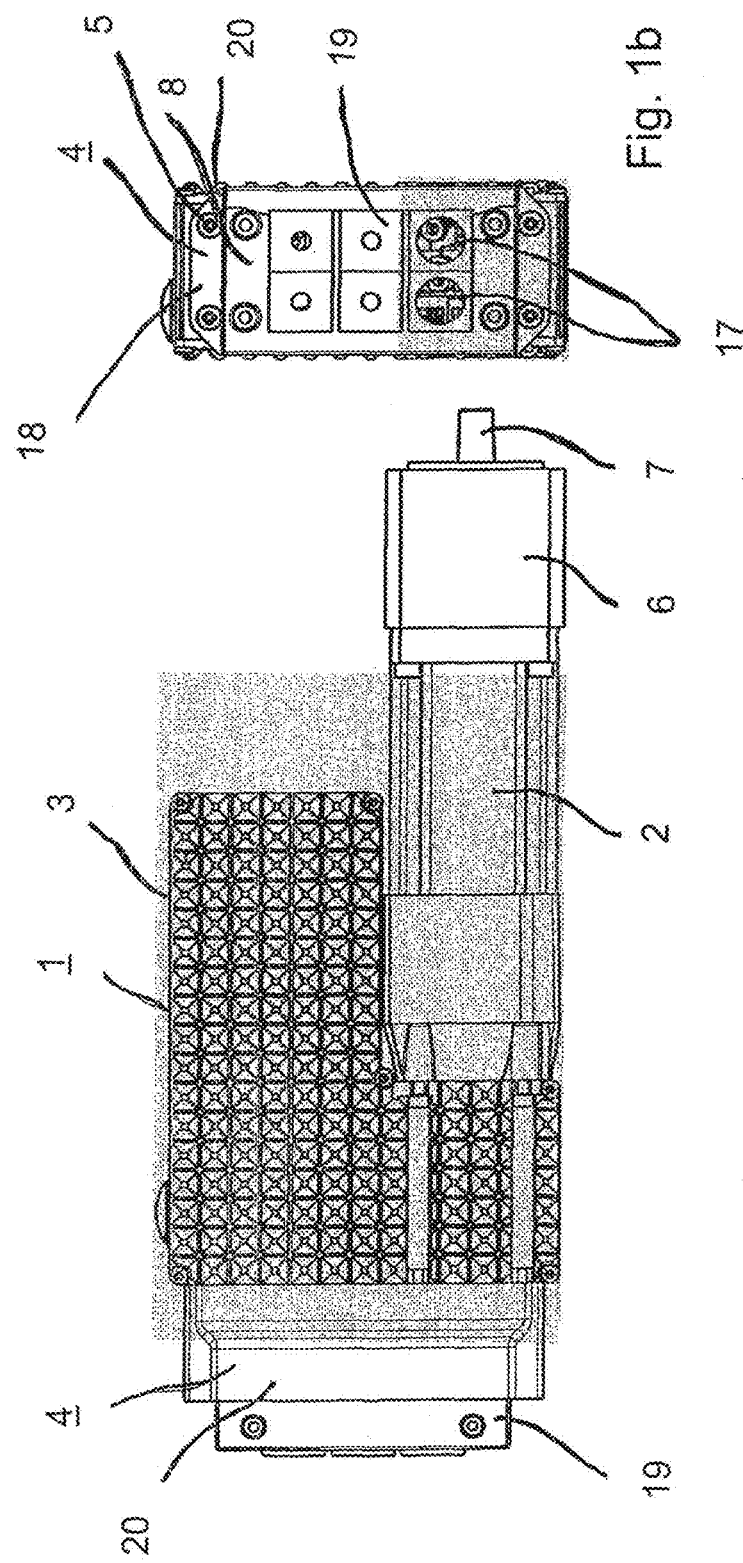
FIGS. 1a and 1b show a side view and a housing-side front view, respectively, of an electromotive drive system, which has an (integral) electronics housing on the motor side, including a mounted connection housing.
Figure 2:
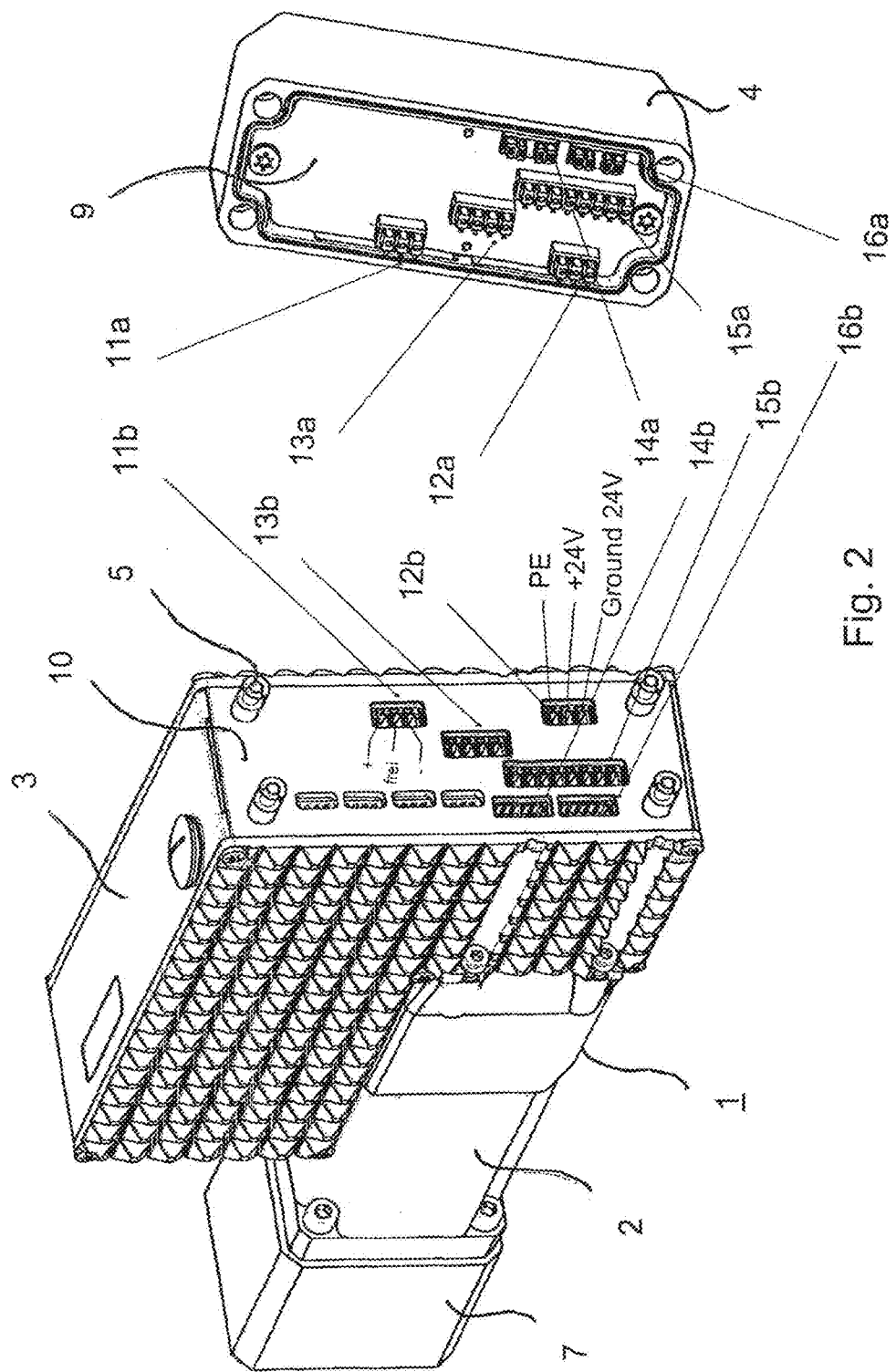
FIG. 2 shows a perspective representation of the drive system with a detached plug connection between the electronics housing and the connection housing, with a view of plug and mating plug connections of the corresponding housing sides of the electronics housing and the connection housing.

Electromotive drive system 1 according to FIGS. 1 and 2 comprises an electric motor in a motor housing 2, on which an electronics housing 3 and a connection housing 4 are arranged, the latter being detachably plug-contacted to electronics housing 3 and mechanically connected thereto, for example, with the aid of a screw connection 5. In the exemplary embodiment, electronics housing 3 is L-shaped and extends partially along the longitudinal side as well as over a narrow side or end face of motor housing 2. On the end face of the electric motor facing away from electronics housing 3, motor or gear shaft 7 is led out from motor housing 2 of the electric motor, for example via a gear set 6.

While FIG. 1b shows connection housing 4 from its connection or front side 8, FIG. 2 shows, in the right half of the figure, connection housing 4 with a view of its plug contact side 9, where plug connections 11a through 16a are arranged. These plug connections 11a through 16a correspond to mating plug connections 11b through 16b on housing or plug contact side 10 of electronics housing 3 facing connection housing 4 or its plug contact side 9.

Specifically, a single plug connection 11a, 11b is provided for a link DC voltage, for example greater than 50 $V_{DC}$ and less than 800 $V_{DC}$. Another individual plug connection 12a, 12b is provided for a supply DC voltage of 50V, in particular 24$V_{DC}$. Another plug connection 14a, 14b is provided for a field bus input, while a plug connection 16a, 16b is furthermore provided for a field bus output. Another plug connection 15a, 15b is used as a digital input and digital output. A plug connection 13a, 13b furthermore acts as a safety connection (STO technology).

Connecting wires of two connecting cables $K_n$ are contacted within connection housing 4, and thus internally in the housing, in a manner which is not illustrated in greater detail. The connecting cables are fed into connection housing 4 on front side 18 thereof via cable openings 17 (FIG. 1b). The terminal contacting of the line ends of connecting cables $K_n$ with contact points of particular plug connections 11 through 16 thus takes place internally within connection housing 4.

According to the exemplary embodiment in FIG. 1b, cable openings 17 may be provided in a front plate 19, which is detachably connected to a corresponding housing part 20 of connection housing 4. In this specific embodiment, front plate 19 is first detached from remaining housing part 20 of connection housing 4 for the purpose of assembly and contacting, and connecting cables $K_n$ are fed through cable openings 17. In this state of assembly, the wire ends of connecting wires $L_n$ guided by connecting cables $K_n$ at the particular contact points of corresponding plug connections 11a through 16a may be established with the aid of screw, clamp or plug connections.

Figure 3:
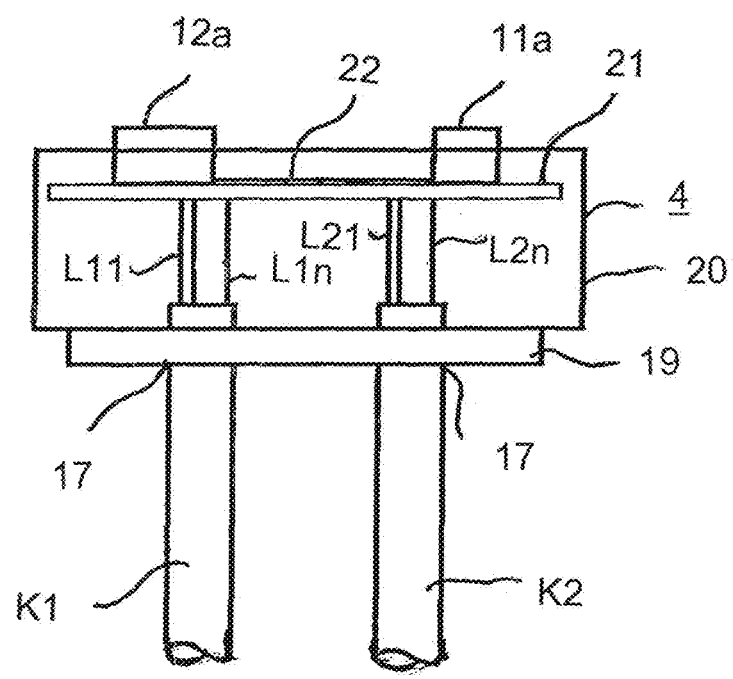
FIG. 3 shows a schematic view of the connection of terminal or connecting wires of two connecting cables in the connection housing.

In the case of connecting wires Ln contacted within connection housing 4 according to FIG. 3, through-contacting areas between at least supply lines L11 through L1n and L21 through L2n, respectively, which are contacted with plug connections 11a, 12a and guided by connecting cables K1 and K2, are established in the form of contact bridges 22 or the like by means of printed circuit board 21 inside the housing. In this manner, a through-connection of the power supply from one of connecting cables K1 to the other connecting cable K2 is established within connection housing 4. A through-connection of the power supply, in particular between two energy-and data-networked drive systems, is maintained even if plug connections 11 through 16, in particular plug connections 11 and 12, for supplying power to a converter electronic system of the electric motor and/or to a control, regulation, sensor, actuator and/or communication electronic system, is detached between electronics housing 3 and connection housing 4, as illustrated in FIG. 2.

Connection housing 4 thus takes on the function of a tee connector with the aid of only one single plug connection 11 through 16 for corresponding connecting wires $L_n$ of both connecting cables $K_n$, while simultaneously always maintaining the through-connection of at least the supply voltage and thus maintaining the power supply of an upstream or downstream drive system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electromotive drive system comprising:
an electronics housing arranged on a motor side; and
a connection housing that is detachably plug-contacted to the electronics housing and is designed for connecting and through-contacting connecting wires of at least two connecting cables,
wherein the connection housing includes a connecting printed circuit board therein and has a plug contact surface that includes a plurality of plug connections projecting from the plug contact surface, the plurality of plug connections being formed on a first surface of the printed circuit board and a terminal side that includes a plurality of connecting openings for the at least two connecting cables,
wherein the electronics housing has a housing surface, which faces the plug contact surface of the connection housing after the connection housing is plug-contacted to the electronic housing and which includes a plurality of mating plug connection openings formed in the housing surface and a mechanical connection projecting from the housing surface for affixing the electronic housing to the connection housing, the plurality of mating plug connection opening respectively aligned to a plurality of mating plug connections corresponding to and mating with the plurality of plug connections in a mating direction,
wherein the connecting cables are guided and connected to a second surface of the connecting printed circuit board opposite from the first surface in the mating direction that is perpendicular to the first and second surfaces, and the connecting wires are contacted to the plug connections inside the connection housing, and
wherein the connecting cables or the connecting wires guided thereby are through-contacted within the connection housing.

2. The electromotive drive system according to claim 1, wherein the connecting cables guide a number of supply wires for predetermined DC voltages.

3. The electromotive drive system according to claim 1, wherein the connecting cables guide a number of signal and/or data wires.

4. The electromotive drive system according to claim 1, wherein the connection housing is provided and configured to through-connect at least one power supply of the drive system from one of the two connecting cables to the other of the two connecting cables.

5. The electromotive drive system according to claim 1, wherein contact of the connecting wires within the connection housing forms a shared plug connector for the two connecting cables, so that the two connecting cables can be plug-contacted with the electronics housing together and simultaneously by the connection housing, and wherein the through-contacting the connection between the two connecting cables or the connecting wires guided thereby within the connection housing is maintained when the plug connection between the connection housing and the electronics housing is detached.

6. The electromotive drive system according to claim 1, wherein the plug and mating plug connections comprise:
a single two-pole plug connection for a link DC voltage;
a single three-pole plug connection for a supply DC voltage;
a plug connection for a field bus input;
a plug connection for a field bus output; and/or
a plug connection for a digital input and a digital output.

7. The electromotive drive system according to claim 6, wherein the link DC voltage is greater than 50 $V_{DC}$, or 60 $V_{DC}$ to 760 $V_{DC}$.

8. The electromotive drive system according to claim 6, wherein the supply DC voltage less than 50 $V_{DC}$ or 24 $V_{DC}$.

9. An electromotive drive system, comprising:
a motor housing;
an electronics housing arranged on a motor side; and
a connection housing, which is detachably plug-contacted to the electronics housing for connection of connecting wires of at least two connecting cables,
wherein the connection housing has a plug contact side, which includes a number of plug connections, and a terminal side, which has connecting openings for the connecting cables;

wherein the electronics housing has a housing side, which faces the plug contact side of the connection housing and which includes mating plug connections corresponding to the plug connections;

wherein the connecting cables are guided to a connecting printed circuit board within the connection housing, and the connecting wires are contacted to the plug connections inside the connection housing;

wherein the connection housing is provided and configured to through-connect at least one power supply of the drive system from one of the two connecting cables to the other of the two connecting cables in that the connecting cables or the connecting wires guided thereby are through-contacted within the connection housing, wherein after contacting of the connecting wires within the connection housing, this represents a shared plug connector for the two connecting cables, so that the two connecting cables can be plug-contacted with the electronics housing together and simultaneously with the connection housing, and wherein due to the through-contacting the connection between the two connecting cables or the connecting wires guided thereby within the connection housing is maintained, when the plug connection between the connection housing and the electronics housing is detached.

* * * * *